United States Patent
Chand

(10) Patent No.: US 9,969,657 B2
(45) Date of Patent: May 15, 2018

(54) STABLE AQUEOUS DISPERSIONS OF ZINC PHOSPHATES

(71) Applicant: LIQUID FERTILISER PTY LTD, Yatala, QLD (AU)

(72) Inventor: Ugesh Chand, Loganholme (AU)

(73) Assignee: LIQUID FERTILISER PTY LTD, Yatala, Queensland (AU)

( * ) Notice: Subject to any disclaimer, the term of this patent is extended or adjusted under 35 U.S.C. 154(b) by 0 days. days.

(21) Appl. No.: 15/108,761

(22) PCT Filed: Oct. 14, 2015

(86) PCT No.: PCT/AU2015/050627
§ 371 (c)(1),
(2) Date: Jun. 28, 2016

(87) PCT Pub. No.: WO2016/058046
PCT Pub. Date: Apr. 21, 2016

(65) Prior Publication Data
US 2016/0318817 A1    Nov. 3, 2016

Related U.S. Application Data

(60) Provisional application No. 62/064,122, filed on Oct. 15, 2014.

(51) Int. Cl.
| | | |
|---|---|---|
| C01B 25/37 | (2006.01) | |
| C05B 17/00 | (2006.01) | |
| C01B 25/45 | (2006.01) | |
| C05B 7/00 | (2006.01) | |
| C05G 3/00 | (2006.01) | |

(52) U.S. Cl.
CPC .............. *C05B 17/00* (2013.01); *C01B 25/37* (2013.01); *C01B 25/45* (2013.01); *C01B 25/451* (2013.01); *C05B 7/00* (2013.01); *C05G 3/007* (2013.01)

(58) Field of Classification Search
None
See application file for complete search history.

(56) References Cited

U.S. PATENT DOCUMENTS

| | | | | | |
|---|---|---|---|---|---|
| 1,926,266 | A | * | 9/1933 | Darsey | C01B 25/37 23/305 R |
| 3,141,732 | A | * | 7/1964 | McCullough | C01B 25/28 423/306 |
| 3,385,660 | A | * | 5/1968 | Dunseth | C01B 25/451 423/306 |
| 3,620,708 | A | | 11/1971 | Ott | |
| 3,856,500 | A | * | 12/1974 | Cox | C05B 13/06 71/1 |
| 4,207,301 | A | * | 6/1980 | Danjushevskaya | C01B 25/37 423/305 |
| 4,294,808 | A | * | 10/1981 | Wasel-Nielen | C01B 25/163 106/14.12 |
| 4,346,065 | A | * | 8/1982 | Maurer | C01B 25/16 106/14.12 |
| 5,137,567 | A | * | 8/1992 | Aubareda Vallvey | C01B 25/37 106/14.12 |
| 5,374,294 | A | * | 12/1994 | Moore | C05B 7/00 423/306 |
| 5,441,717 | A | * | 8/1995 | Ohsumi | A01N 59/26 423/306 |
| 8,216,972 | B1 | * | 7/2012 | Fabry | A01N 59/26 423/307 |
| 2004/0011429 | A1 | * | 1/2004 | Miyamoto | C23C 22/78 148/254 |
| 2008/0307845 | A1 | * | 12/2008 | Marks | A01N 47/30 71/28 |
| 2014/0360240 | A1 | * | 12/2014 | Wissing | C01B 25/375 71/53 |
| 2015/0001446 | A1 | * | 1/2015 | Buehler | C01B 25/38 252/301.36 |

FOREIGN PATENT DOCUMENTS

| | | | |
|---|---|---|---|
| CN | 102531758 | * | 7/2012 |
| CN | 103718794 A | | 4/2014 |
| WO | WO 2015000996 A1 | | 1/2015 |

OTHER PUBLICATIONS

Yabo Sun et al, "Synthesis and characteristics of multi-micronutrient slow-dissolving fertilizer ammonium zinc phosphate by solid state reaction", Wujiyan Gongye (2005), 37 (12), 12-14.*
A. Iovi et al, "Studies concerning the obtaining of prime fertilizers with microelements", Chemical Bulletin of the Technical University of Timisoara (1991), 36 (50), 159-66.*
A. Iovi et al, "Preparation of ammonium zinc phosphate", Revistade Chimie (Bucharest, Romania) (1993), 44 (7), 648-52.*
International Search Report of PCT/AU2015/050627 dated Feb. 10, 2016.

* cited by examiner

*Primary Examiner* — Wayne Langel
(74) *Attorney, Agent, or Firm* — Renner, Kenner; Arthur M. Reginelli

(57) ABSTRACT

An aqueous dispersion comprising water and potassium zinc phosphate dispersed within the water.

31 Claims, No Drawings

STABLE AQUEOUS DISPERSIONS OF ZINC PHOSPHATES

This application claims the benefit of International Application Serial No. PCT/AU2015/050627, filed on Oct. 14, 2015, and U.S. Provisional Patent Application Ser. No. 62/064,122, filed on Oct. 15, 2014, which are incorporated herein by reference.

FIELD OF THE INVENTION

Embodiments of the present invention are directed toward stable aqueous dispersions of zinc phosphates such as potassium zinc phosphates and ammonium zinc phosphates. Other embodiments are directed toward methods for preparing the stable aqueous dispersions of zinc phosphates. And yet other embodiments are directed toward the use of the stable dispersions of zinc phosphates as liquid fertilizer.

BACKGROUND OF THE INVENTION

Divalent metal phosphates have been proposed as fertilizers. These compounds advantageously provide multiple nutrients and exhibit slow, controlled release properties. To date, divalent metal phosphates have been produced as solid materials, and therefore techniques for their use as plant nutrients have been limited to the application of solids in the form of, for example, pellets. For example, U.S. Pat. No. 5,374,294 teaches a controlled, slow-release potassium divalent metal phosphate composition. These compositions are prepared by co-reacting concentrated potassium hydroxide, divalent metal oxide powder, and concentrated phosphoric acid. This reaction produces a damp dry, particulate, water insoluble potassium divalent metal phosphate.

SUMMARY OF THE INVENTION

One or more embodiments of the present invention provide an aqueous dispersion comprising water and potassium zinc phosphate dispersed within the water.

Still other embodiments of the present invention provide a method for preparing a flowable liquid fertilizer. The method comprising the steps of providing an aqueous dispersion of zinc oxide with a pH of greater than 9, and introducing a phosphate salt to the aqueous dispersion of zinc oxide having a pH of greater than 9 to thereby form the flowable liquid fertilizer.

Still other embodiments of the present invention provide a method of applying a zinc phosphate as a fertilizer to plant. The method comprising providing an aqueous dispersion of a zinc phosphate and applying the aqueous dispersion of a zinc phosphate to the plant.

DETAILED DESCRIPTION OF ILLUSTRATIVE EMBODIMENTS

Embodiments of the invention are based, at least in part, on the discovery of a stable aqueous dispersion of zinc phosphates such as potassium zinc phosphate and ammonium zinc phosphate. The stable aqueous dispersions of the present invention are uniquely prepared in a step reaction where a zinc oxide dispersion having a pH of greater than 9 is provided, and then a phosphate salt is introduced to the dispersion. It is believed that the phosphate salt reacts or otherwise interacts with the zinc oxide to provide the zinc phosphates while maintaining a stable dispersion. It has unexpectedly been discovered that the order in which the reactants are introduced is critical to consistently achieving a stable and flowable aqueous dispersion having minimal byproducts. Likewise, it has unexpectedly been discovered that the pH of the zinc oxide dispersion is critical to achieving a stable and flowable aqueous dispersion wherein the particles of the zinc phosphates have an advantageous size. The stable aqueous dispersion advantageously provides novel methods for providing nutrients to plants by way of a liquid fertilizer.

Method to Produce Aqueous Dispersion

As indicated above, the method for producing the aqueous dispersion of the present invention includes (i) providing an aqueous dispersion of zinc oxide having a pH of greater than 9, and (ii) introducing a phosphate salt to the pH adjusted aqueous dispersion of zinc oxide. In one or more embodiments, the method includes (i) providing an aqueous dispersion of zinc oxide; (ii) adjusting the of the aqueous dispersion of zinc oxide to a of greater than 9 to form a pH adjusted dispersion, and (iii) introducing a phosphate salt to the adjusted aqueous dispersion of zinc oxide. In one or more embodiments, plant nutrition compounds, plant growth regulators and/or plant beneficial microbes can be added to the aqueous dispersion.

Preparation of ZnO Dispersion

In one or more embodiments, the zinc oxide dispersion can be prepared by dispersing, which may include emulsifying, a mixture of zinc oxide and water. In one or more embodiments, this dispersion may be prepared in the presence of a dispersant or emulsifying agent. In other embodiments, the dispersion is prepared in the absence of a dispersant or emulsifying agent. Without wishing to be bound by any particular theory, it is believed that the zinc oxide is appreciably insoluble in the aqueous medium.

In one or more embodiments, the dispersion can be characterized by including at least 90%, in other embodiments at least 95%, and in other embodiments at least 99% of the zinc oxide particles having a particle size of less than 1 micron. In other embodiments, especially where a dispersant is not employed, the particle size of at least 90%, in other embodiments at least 95%, and in other embodiments at least 99% of the zinc oxide particles is less than 2.7 microns, in other embodiments less than 2.3 microns, and in other embodiments less than 2.0 microns.

In one or more embodiments, the zinc oxide raw material employed in preparing the dispersion of zinc oxide is characterized by an average particle size of from about 1 to about 4 micron, in other embodiments from about 2 to about 3 micron, and in other embodiments from about 2.3 to about 2.7 microns. In these or other embodiments, the zinc oxide is at least 98%, in other embodiments at least 99.0%, and in other embodiments at least 99.9% pure.

In one or more embodiments, the concentration of the zinc oxide within the aqueous dispersion may be described based upon the weight parts of zinc oxide relative to the water. In one or more embodiments, the zinc oxide dispersion includes at least 10, in other embodiments at least 11, and in other embodiments at least 12 parts by weight zinc oxide per 100 parts by weight water. In these or other embodiments, the zinc oxide dispersion includes at most 15, in other embodiments at most 14, and in other embodiments at most 13 parts by weight zinc oxide per 100 parts by weight water. In one or more embodiments, the zinc oxide dispersion includes from about out 15, in other embodiments from about 11 to about 14, and in other embodiments from about 12 to about 13 parts by weight zinc oxide per 100 parts by weight water.

In one or more embodiments, useful dispersants include organic-based dispersants such as polyester, polyurethane, polyacrylate, and polyacrylic dispersants, as well as salts thereof. Exemplary salts include, sodium polyacrylates, potassium polyacrylates, and ammonium polyacrylates. In these or other embodiments, inorganic-based dispersants may also be employed such as, but not limited to, polyphosphates and phosphate salts such as tetrapotassium pyrophosphate and sodium polyphosphate. Many useful dispersants are commercially available. For example, polyacrylate dispersants can be obtained under the tradenames Agrilan 789, Agrilan 782, Accusol 445, Lopon (including potassium and ammonium acrylates), AcriFlow US-2, and Darvan 811. Useful phosphates include those obtained under the tradenames Calgon N or Calgon 322.

The amount of dispersant employed can be varied based upon the dispersant selected, and the skilled person can readily determine an appropriate amount of dispersant to use in order to achieve the desired zinc oxide dispersion. As suggested above, the aqueous dispersion of zinc oxide may be devoid of dispersant or emulsifying agent. In other embodiments, such as where a poly-acrylic-based or poly-acrylate-based dispersant is employed, useful amounts include from about 1 to about 15, in other embodiments from about 5 to about 12, and in other embodiments from about 8 to about 10 parts by weight dispersant per 100 parts by weight zinc oxide.

In one or more embodiments, the preparation of the zinc oxide dispersion may take place at standard conditions. For example, in particular embodiments, the dispersion can be prepared at ambient temperatures. In one or more embodiments, the dispersion of zinc oxide may be prepared at temperatures of less than 150, in other embodiments less than 125, in other embodiments less than 100, in other embodiments less than 80, in other embodiments less than 60 and in other embodiments less than 40° C. In these or other embodiments, the dispersion of zinc oxide may be prepared at temperatures greater than 20, in other embodiments greater 30, in other embodiments greater than 40, in other embodiments greater than 50, and in other embodiments greater than 60° C. In particular embodiments, the temperature of the zinc oxide dispersion during preparation may be maintained within a narrow temperature variation; for example, the temperature may be maintained within +/−15, in other embodiments +/−10, in other embodiments +/−5, and in other embodiments +/−3° C.

In one or more embodiments, the preparation of the zinc oxide dispersion may take place at atmospheric pressure. In other embodiments, the dispersion can be prepared under vacuum at, for example, less than 0.5 atmospheres, or in other embodiments at, for example, less than 0.25 atmospheres. In yet other embodiments, the dispersion can be prepared at elevated pressures. In one or more embodiments, the dispersion can be prepared by using conventional emulsification techniques and equipment.

Preparation of ZnO—KOH Mixture

As indicated above, the pH of the zinc oxide dispersion is adjusted (prior to introducing the phosphate) to a pH above 9 to thereby provide a pH adjusted dispersion of zinc oxide. In one or more embodiments, the pH of the aqueous dispersion (prior to introduction of the phosphate) is adjusted above 9.5, in other embodiments above 10.0, in other embodiments above 10.3, in other embodiments above 10.5, in other embodiments above 10.7, in other embodiments above 11.0, in other embodiments above 11.3, in other embodiments above 11.5, in other embodiments above 11.7, and in other embodiments above 12.0. In these or other embodiments, the pH of the zinc oxide dispersion is adjusted to a pH of from about 9.5 to about 14.5, in other embodiments from about 10 to about 14.0, in other embodiments from about 10.5 to about 13.5, and in other embodiments from about 11.0 to about 13.0. In particular embodiments, the process is devoid of the use of a buffer.

In one or more embodiments, the pH is adjusted by introducing a base (alkali) to the zinc oxide dispersion. In other embodiments, the zinc oxide dispersion may be prepared in the presence of the base; i.e. the base may be added to the water in which the zinc is introduced prior to introducing the zinc.

In one or more embodiments, the base is water soluble, which for purposes of this specification refers to a base that is appreciably water soluble; i.e. the skilled person can readily recognize whether the base is soluble in water. Also, in one more embodiments, the base that is employed to adjust the pH of the zinc oxide dispersion will not be appreciably reactive with the zinc oxide.

In one or more embodiments, useful water-soluble bases include, but are not limited to, potassium hydroxide, sodium hydroxide, aqua ammonium, monoethanolamine, diethanolamine, and triethanolamine.

An example of a useful base that can be employed to adjust the pH of the zinc oxide dispersion includes potassium hydroxide. Without wishing to be bound by any particular theory, it is believed that the potassium hydroxide is appreciably soluble within the aqueous dispersion. It is also believed that there is not an appreciable reaction between the potassium hydroxide and the zinc oxide. In any event, for purposes of the present specification, the term "aqueous mixture of zinc oxide and potassium hydroxide" will be employed to describe the combination of ingredients regardless of whether an appreciable reaction takes place.

In those embodiments where potassium hydroxide is employed to adjust the pH of the zinc oxide dispersion, the amount of potassium hydroxide introduced to the aqueous dispersion of zinc oxide may be described based upon the molar ratio of moles of potassium within the potassium hydroxide to the moles of zinc within the zinc oxide (i.e., moles of K to moles of Zn). In one or more embodiments, the molar ratio of the moles of potassium within the potassium hydroxide to the moles of zinc within the zinc oxide may be at least 0.8:1 in other embodiments at least 1.3:1, and in other embodiments at least 1.7:1. In these or other embodiments, the molar ratio of the moles of potassium within the potassium hydroxide to the moles of zinc within the zinc oxide may be at most 3.2:1, in other embodiments at most 3.0:1, in other embodiments at most 2.8:1, in other embodiments at most 2.2:1, and in other embodiments at most 1.9:1. In one or more embodiments, the molar ratio of the moles of potassium within the potassium hydroxide to the moles of zinc within the zinc oxide may be from about 0.8:1 to about 2.8:1, in other embodiments from about 1.3:1 to about 2.2:1, and in other embodiments from about 1.7:1 to about 1.9:1. While the foregoing has been provided for potassium hydroxide, the skilled person will be able to readily determine, without undue experimentation or calculation, an appropriate amount of water-soluble base to use and achieve the desired pH.

Following the introduction of the potassium hydroxide to the zinc oxide dispersion, the pH of the aqueous mixture should be basic or it may be buffered to maintain a basic solution/mixture. In particular embodiments, the process is devoid of the use of a buffer.

In one or more embodiments, the pH of the pH-adjusted aqueous dispersion of zinc oxide may be buffered by introducing an acid. In particular embodiments, an organic acid is added. Exemplary organic acids include, but are not limited to, citric acid. The skilled person will be able, without undue experimentation, to readily determine the appropriate type and amount of buffer to achieve the desired pH.

In one or more embodiments, the preparation of the pH adjusted aqueous dispersion of zinc oxide and potassium hydroxide may take place at standard conditions. For example, in particular embodiments, the mixture can be prepared at ambient temperatures. In one or more embodiments, the base may be introduced to the zinc oxide dispersion at temperatures of less than 150, in other embodiments less than 125, in other embodiments less than 100, in other embodiments less than 80, in other embodiments less than 60 and in other embodiments less than 40° C. In these or other embodiments, the base may be introduced to the zinc oxide dispersion at temperatures greater than 20, in other embodiments greater 30, in other embodiments greater than 40, in other embodiments greater than 50, and in other embodiments greater than 60° C. In particular embodiments, the temperature of the pH adjusted zinc oxide dispersion may be maintained within a narrow temperature variation; for example, the temperature may be maintained within +/−15, in other embodiments +/−10, in other embodiments +/−5, and in other embodiments +/−3° C.

In one or more embodiments, the preparation of the pH adjusted aqueous zinc oxide dispersion may take place at atmospheric pressure. In other embodiments, the mixture can be prepared under vacuum at, for example, less than 0.5 atmospheres, or in other embodiments at, for example, less than 0.25 atmospheres. In yet other embodiments, the mixture can be prepared at elevated pressures. In one or more embodiments, the dispersion can be prepared by using conventional emulsification techniques and equipment.

Introduction of $KH_2PO_4$ to ZnO—KOH Mixture

As indicated above, a phosphate salt is introduced to the pH adjusted zinc oxide dispersion. Again, without wishing to be bound by any particular theory, it is believed that the zinc oxide and phosphate salt react or interact to produce potassium zinc phosphate. Embodiments of the invention, however, are not limited by the exact structure of the product produced. The term "zinc phosphate" will nonetheless be employed to refer to this reaction product.

In one or more embodiments, water-soluble phosphate salts are employed. For purposes of this specification, water-soluble phosphate salts include those phosphate salts that are appreciably water soluble; i.e. the skilled person can readily recognize whether the phosphate salt is soluble in water.

In one or more embodiments, the phosphate salt is a potassium phosphate salt, and therefore the reaction product is potassium zinc phosphate. Useful potassium phosphate salts include monopotassium phosphate and dipotassium phosphate. In other embodiments, the phosphate salt is an ammonium phosphate salt, and therefore the reaction product is ammonium zinc phosphate. Useful ammonium phosphate salts include monoammonium phosphate and diammonium phosphate.

In one or more embodiments, the amount of phosphate salt introduced to the pH adjusted zinc oxide dispersion may be described based upon the molar ratio of the moles of phosphorus within the phosphate salt to the moles of zinc within the zinc oxide (i.e., moles of P to moles of Zn). In one or more embodiments, the molar ratio of moles of phosphorus within the phosphate salt to the moles of zinc within the zinc oxide may be at least 1.1:1, in other embodiments at least 1.4:1, in other embodiments at least 1.8:1, and in other embodiments at least 2.4:1. In one or more embodiments, the molar ratio of moles of phosphorus within the phosphate salt to the moles of zinc within the zinc oxide may be at most 3.9:1, in other embodiments at most 3.2:1, in other embodiments at most 2.6:1, and in other embodiments at most 2.2:1. In one or more embodiments, the molar ratio of moles of phosphorus within the phosphate to the moles of zinc within the zinc oxide may be from about 1.1:1 to about 3.9:1, in other embodiments from about 1.4:1 to about 2.6:1, in other embodiments from about 1.8:1 to about 3.2:1, in other embodiments from about 2.4:1 to about 2.6:1, and in other embodiments from about 1.8:1 to about 2.2:1.

In one or more embodiments, the preparation of the zinc phosphate (e.g. the step of adding the monopotassium phosphate or ammonium phosphate and the subsequent reaction) may take place at standard conditions. For example, in particular embodiments, the zinc phosphate can be prepared at ambient temperatures. In one or more embodiments, the zinc phosphate may be prepared at temperatures of less than 150, in other embodiments less than 125, in other embodiments less than 100, in other embodiments less than 80, in other embodiments less than 60 and in other embodiments less than 40° C. In these or other embodiments, the zinc phosphate may be prepared at temperatures greater than 20, in other embodiments greater 30, in other embodiments greater than 40, in other embodiments greater than 50, and in other embodiments greater than 60° C. In particular embodiments, the temperature of the reaction mixture may be maintained within a narrow temperature variation; for example, the temperature may be maintained within +/−15, in other embodiments +/−10, in other embodiments +/−5, and in other embodiments +/−3° C.

In one or more embodiments, the preparation of the zinc phosphate may take place at atmospheric pressure. In other embodiments, the zinc phosphate can be prepared under vacuum at, for example, less than 0.5 atmospheres, or in other embodiments at, for example, less than 0.25 atmospheres. In one or more embodiments, operation under vacuum may be advantageous because it can permit capture of volatile compounds. In yet other embodiments, the mixture can be prepared at elevated pressures.

In one or more embodiments, the zinc phosphate can be prepared by using conventional emulsification techniques and equipment. The resultant mixture may be mixed using conventional mixing techniques. In one or more embodiments, the resulting mixture and/or reaction product is subjected to emulsification. As with preparation of the aqueous dispersion of the zinc oxide, conventional emulsification techniques and equipment may be employed.

Following emulsification, other ingredients may be added to the aqueous dispersion. These other constituents may include constituents and/or adjuvants that are conventional in the art. For example, one or more biocides may be included such as, but not limited to, hexa-hydro 1,3,5 tris(2 hydroxyethyl)-symtriazine, which is available under the trade names Glokill 77 or Emulcid. In these or other embodiments, one or more antifoaming agents may be introduced. Useful antifoaming agents include, but are not limited to, polydimethylsiloxane, which is available under the trade names Gensil 2030, Silfax, and Ziameter. The skilled person will be able to readily determine an appropriate amount other constituents and/or adjuvants based upon desired needs.

Addition of Optional Agrochemicals

As indicated above, plant nutrition compounds, plant growth regulators and/or plant beneficial microbes can be added to the aqueous dispersion of this invention. The amount of these additives can be varied based upon a number of factors such as, but not limited to, crop type, stage of growth or soil type and known nutrient status of the soil.

In one or more embodiments, useful plant nutrition compounds include sources of nitrogen. Exemplary nitrogen substitutes, including controlled release nitrogen sources, include urea, potassium nitrate, ammonium nitrate, ammonium sulphate, urea ammonium nitrate, calcium nitrate, magnesium nitrate and organic nitrogen as derived from plant, animal or fish based sources such as protein hydrolysates, fish emulsion or corn steep liquor.

In other embodiments, the plant nutrition compounds may include sources of macro, secondary or plant micronutrients.

Exemplary potassium-containing plant micronutrients include, but are not limited to, potassium thiosulfate, potassium chloride, potassium nitrate, potassium sulfate, potassium magnesium sulfate.

Exemplary phosphorus-containing plant micronutrients include, but are not limited to monopotassium phosphate, dipotassium phosphate, monopotassium phosphate, dipotassium phosphate, calcium phosphate, tetrapotassium pyrophosphate, ammonium polyphosphate, sodium tripolyphosphate, phosphoric acid and phosphorous acid.

Exemplary sulfur-containing plant micronutrients include, but are not limited to, calcium sulphate, magnesium sulphate, calcium thiosulphate, magnesium thiosulphate, potassium thiosulphate, ammonium thiosulphate, potassium sulphate, and monopotassium sulphate.

Still other exemplary plant micronutrients include, but are not limited to, iron sulphate, manganese sulphate, copper sulphate, zinc sulphate, boric acid, sodium molybdate, ammonium molybdate, ferric chloride, zinc chloride, zinc nitrate, as well as chelates thereof (i.e. chelated forms thereof).

Exemplary plant growth modifiers or regulators include, but are not limited to, auxins and cytokinins in synthetic form or in natural derived form such as seaweed or seaweed extracts.

Exemplary plant beneficial microbes include but not limited to *Bacillus* spp, *Paenobacillus* spp, *Brevibacillus* spp, *Metarhizium* spp, *Trichoderma* spp, *Glomus* spp, Vesicular Arbuscular Mycorrhizae, *Rhizobium* spp, *Bradyrhizobium*, *Paecilomyces* spp, and *Beauveria* spp.

Finishing Techniques and Procedures

In one or more embodiments, the aqueous dispersions of potassium zinc phosphate may be subjected to one or more finishing procedures prior to storage, transportation, and/or use. For example, in one or more embodiments, the aqueous dispersions may be subjected to filtering in order to remove processing debris or raw material impurities released from the raw materials during the course of the synthesis. This may include filtering the aqueous dispersion through a 100 micron down to 1 micron filter bag of either mesh or felt fabric, although the skilled person can choose finer filtering materials to achieve smaller particle sizes.

Characteristics of Aqueous Dispersion

As indicated above, it is believed that the methods described herein yield an aqueous dispersion of potassium zinc phosphate. This dispersion may be characterized by one or more advantageous characteristics.

In one or more embodiments, the aqueous dispersion of zinc phosphate (e.g. potassium zinc phosphate or ammonium zinc phosphate) is characterized by a pH of at least 6.0, in other embodiments at least 7.0, in other embodiments at least 8.0, in other embodiments at least 8.5, and in other embodiments at least 8.7. In these or other embodiments, the dispersion of potassium zinc phosphate is characterized by a pH of at most 14, in other embodiments at most 12, in other embodiments at most 10, in other embodiments at most 9.5, and in other embodiments at most 9.0. In one or more embodiments, the aqueous dispersion of potassium zinc phosphate is characterized by a pH of from about 6.0 to about 14, in other embodiments from about 7.0 to about 12, in other embodiments from about 8.0 to about 10, in other embodiments from about 8.5 to about 9.5, and in other embodiments from about 8.7 to about 9.0.

In one or more embodiments, the aqueous dispersion of zinc phosphate (e.g. potassium zinc phosphate or ammonium zinc phosphate) is characterized by an advantageous particle size. In one or more embodiments, the particles within the dispersion may be quantitatively characterized by a distribution where at least 90%, in other embodiments at least 95%, and in other embodiments at least 99% of the particles dispersed within the aqueous dispersion have a particle size of less than 1 micron. In one or more embodiments, at least 90%, in other embodiments at least 95%, and in other embodiments at least 99% of the particles dispersed have a mean particle size of from 0.1 to 0.5, or 0.2 to 0.4 microns. In one or more embodiments, the aqueous dispersions of this invention are characterized in that the dispersions are colloidal dispersion, which the skilled person appreciates refers to those dispersions where the average particle size of the dispersed particles is less than 1.0 micron and generally in the range of about 0.1 to about 1.0 micron.

In one or more embodiments, the aqueous dispersion of zinc phosphate (e.g. potassium zinc phosphate or ammonium zinc phosphate) is characterized by an advantageous particle morphology. For example, in one or more embodiments, particles of the zinc phosphate may be characterized by a platelet or sheet-like shape. These platelet particles may be characterized by having at least one dimension that is less than 1, in other embodiments less than 0.5, in other embodiments less than 0.3, in other embodiments less than 1.5, and in other embodiments less than 1.0 micron. Other particle shapes may also be employed. In one or more embodiments, these other shapes, such as needles or cubes, may have a contact surface area (i.e. the surface of the particle that contacts the substrate, such as a leave of a plant) relative to the total surface of the particle of greater than 1:6, in other embodiments greater than 1:4, in other embodiments greater than 1:3, and in other embodiments greater than 1:2.5

In one or more embodiments, the aqueous dispersion of zinc phosphate (e.g. potassium zinc phosphate or ammonium zinc phosphate) is characterized by a Brookfield viscosity (as measured using Brookfield RVT, spindle #3, at 25° C. and 20 rpm) of at least 1,000, in other embodiments at least 1,200, and in other embodiments at least 1,500 cps. In these or other embodiments, the aqueous dispersion of potassium zinc phosphate is characterized by a Brookfield viscosity of less than 5,000, in other embodiments less than 3,000, in other embodiments less than 2,700, and in other embodiments less than 2,500 cps. In one or more embodiments, the aqueous dispersion of potassium zinc phosphate is characterized by a Brookfield viscosity of from about 900 to about 5000, in other embodiments from about 1,000 to about 3,000, in other embodiments from about 1,200 to about 2,700, and in other embodiments from about 1,500 to about 2,500 cps.

In one or more embodiments, the composition includes a mixture of suspended solids and also dissolved solids. The solids content can be varied based upon the addition of plant nutrition compounds or plant growth regulators. In one or more embodiments, the total solids content varies between 60% w/w to 75% w/w, or in other embodiments between 65% w/w to 70% w/w. In one or more embodiments, the suspended sub-micron solids content can vary from 15% w/w to 25% w/w, or in other embodiments 19% w/w to 20% w/w approximately.

In one or more embodiments, the aqueous dispersion of zinc phosphate (e.g. potassium zinc phosphate or ammonium zinc phosphate) is characterized by an advantageous shelf life, which may be defined according to CIPAC method: MT 46 Accelerated Storage Tests by Heating or APVMA, December 2005, Guidelines for Generation of Storage Stability Data of Agricultural Chemical Products. In one or more embodiments, the shelf life may be at least 12 months, in other embodiments at least 18 months, and in other embodiments at least 24 months.

In one or more embodiments, the aqueous dispersions of zinc phosphate (e.g. potassium zinc phosphate or ammonium zinc phosphate) prepared according to the present invention may be characterized by an advantageous zeta potential, which may be determined by microelectrophoresis and/or electrophoretic light scattering. In one or more embodiments, the zeta potential is greater than +30, in other embodiments greater than +35, in other embodiments greater then +40, and in other embodiments greater than +45 milliVolts at a pH of 7+/−1. In other embodiments, the zeta potential is less than −30, in other embodiments less than −35, in other embodiments greater then −40, and in other embodiments less than −45 milliVolts at a pH of 6.0 to about 14, in other embodiments from about 7.0 to about 12, in other embodiments from about 8.0 to about 10, in other embodiments from about 8.5 to about 9.5, and in other embodiments from about 8.7 to about 9.0.

In one or more embodiments, the aqueous dispersions of zinc phosphate (e.g. potassium zinc phosphate or ammonium zinc phosphate) prepared according to the present invention may be characterized by a refractive index of from about 1.3 to about 1.9, in other embodiments from about 1.4 to about 1.8, and in other embodiments from about 1.4 to about 1.7.

Use as Liquid Fertilizer

As indicated above, the aqueous dispersions of zinc phosphate (e.g. potassium zinc phosphate or ammonium zinc phosphate) produced according to the present invention can advantageously be used as liquid fertilizer. These liquid fertilizers can advantageously be applied as flowable liquids directly to plant life by way of foliar application or by way of soil application. In other embodiments, these liquid fertilizers can be applied to soils such as, but not limited to, sands, silts, and clays. In yet other embodiments, these liquid fertilizers may be added directly to nutrient solutions employed in soilless growing systems such as, but not limited to, hydroponics, nutrient film techniques, and those fertigation/irrigation systems that employ media such as coca peat, coir, and rockwool. In still other embodiments, these dispersions can be directly applied to seeds (i.e. seed coating, seed dressing, and seed treatment). In yet other embodiments, the dispersions of this invention can be used to coat and/or impregnate solid fertilizer granules and prills such as, but not limited to, diammonium phosphate, monoammonium phosphate, monopotassium phosphate, and urea. In other embodiments, the dispersions of this invention can be dispersed into other fertilizers during their production; for example, it can be dispersed into urea melt (such as urea lava at 150° C.) and then cooled. Advantageously, a wide range of loadings are possible when combining the dispersion of this invention with the manufacture of the commodity fertilizer and/or post adding the dispersion as a surface coating to commodity fertilizers. For example, 10 L of the dispersion of this invention can be sprayed and dried onto 1 ton of diammonium phosphate granules to provide diammonium phosphate with 0.1% zinc as a micronutrient.

In one or more embodiments, while the aqueous dispersions of zinc phosphate (e.g. potassium zinc phosphate or ammonium zinc phosphate), as described above, may be fairly concentrated, which can facilitate transportation and storage, these aqueous dispersions can then be diluted prior to use in the field. For example, those skilled in the art will be able to make and use diluted compositions based upon desired usage rates for the zinc phosphate (e.g. potassium zinc phosphate or ammonium zinc phosphate) and/or complementary fertilizers such as a source of nitrogen.

The dispersions prepared in one or more embodiments of this invention are advantageously compatible with other agrochemicals within aqueous solutions. For example, the aqueous dispersions of zinc phosphate (e.g. potassium zinc phosphate or ammonium zinc phosphate) can be combined with concentrated (including saturated) solutions of, for example, diammonium phosphate, monoammonium phosphate, and urea while maintaining the dispersion of the potassium zinc phosphate and the solubility of the complementary chemical (e.g. diammonium phosphate). Moreover, these compatible liquid fertilizer systems can be prepared without the use of chelates. Additionally, these liquid fertilizer systems, which include compatible blends of the insoluble zinc phosphates (e.g. potassium zinc phosphate or ammonium zinc phosphate) with concentrated solutions of agrochemicals, are advantageously stable for extended periods such as at least 1 day, in other embodiments at least 3 days, in other embodiments at least 1 week.

The aqueous dispersions of zinc phosphate (e.g. potassium zinc phosphate or ammonium zinc phosphate), or diluted compositions thereof, can be applied to a plant by employing a variety of techniques. In one or more embodiments, spraying techniques are employed. In other embodiments, the liquid fertilizer produced according to the present invention can be applied to the plant through the soil. Known techniques include saturating or drenching the surrounding soil with the aqueous dispersion. Specific application methods may employ a spray boom, a hand sprayer, low volume applicators, high and low volume field-mounted equipment, aerial sprayers, controlled droplet applicators, CDA equipment, and/or combinations thereof.

The liquid fertilizers of this invention may advantageously be applied to a variety of agricultural crops. And, it has been discovered that the zinc phosphate (e.g. potassium zinc phosphate or ammonium zinc phosphate) prepared according to this invention have several agricultural benefits. For example, the zinc phosphate (e.g. potassium zinc phosphate or ammonium zinc phosphate) prepared according to embodiments of this invention are believed to enhance the mobility and translocation of nutrients (e.g. potassium, calcium, and phosphorus) within the soil. Also, the zinc phosphate (e.g. potassium zinc phosphate or ammonium zinc phosphate) are believed to contribute to the prolonged availability of nutrients to the plant, and protect the nutrients from chemical and soil tie up.

In order to demonstrate the practice of the present invention, the following examples have been prepared and tested. The examples should not, however, be viewed as limiting the scope of the invention. The claims will serve to define the invention.

EXPERIMENTAL SECTION

Example 1

To a two liter polypropylene graduated beaker was added 446 grams of water, 10 grams of a polyacrylate dispersant, and 125 grams of zinc oxide (99.8% purity). The beaker was stirred by using an IKA Rw20n bench-top overhead mixer fitted with a 40 cm long, four-blade 5 cm stainless steel paddle at 1900 rpm for 1 minute and then at 1300 rpm for 15 minutes. 70 gram of citric acid (99.9% purity) and 170 grain of potassium hydroxide (99.9% purity) was then charged to the beaker. It was noted that the temperature of insoluble content was determined using a Gravimetric method (involving dilution of sample, settling of solids and then drying of the solids).

This Example shows at least some of the benefits of the present invention in that the dispersion has, among other beneficial properties, an advantageous viscosity and particle size.

TABLE

| | Ex. 1.1 | Ex. 1.2 | Ex. 1.3 | Ex. 1.4 | Ex. 1.5 | Ex. 1.6 | Ex. 1.7 | Ex. 1.8 | Ex. 1.9 |
|---|---|---|---|---|---|---|---|---|---|
| INGREDIENTS (GRAMS) | | | | | | | | | |
| Water | 446 | 678 | 460 | 678 | 674 | 620 | 665 | 818 | 500 |
| Zinc Oxide 99.8% min | 125 | 125 | 125 | 125 | 125 | 125 | — | 125 | 125 |
| Citric Acid 99.9% | 70 | — | 70 | — | — | — | — | — | — |
| Potassium Hydroxide 90% min | 170 | 100 | 170 | — | 25 | — | 200 | 50 | — |
| Monopotassitan Phosphate crystalline | 500 | 450 | 500 | — | — | — | 450 | 300 | — |
| Urea | 160 | — | — | — | — | — | — | — | — |
| Gum Base | 50 | 50 | — | 50 | — | 50 | — | — | — |
| Tetrapotassium Pyrophosphate 96% | — | 25 | — | — | 25 | 25 | — | 25 | — |
| Agri-Fos 600 | — | — | 314 | — | — | — | — | — | — |
| Sodium Hydroxide 99% | — | — | — | 25 | — | — | — | — | — |
| Monoammonium Phosphate ctystalline | — | — | — | 225 | 225 | 225 | — | — | 275 |
| Diammonium Phosphate crystalline | — | — | — | 175 | 175 | 150 | — | — | — |
| Monoethanolamine | — | — | — | — | — | 35 | — | — | — |
| Polyacrylate | 10 | — | 10 | 10 | — | — | 10 | — | 8 |
| Zinc Acetate AR Grade | — | — | — | — | — | — | 200 | — | — |
| Phosphoric Acid 85% w/w | — | — | — | — | — | — | — | — | 84 |
| PROPERTIES: | | | | | | | | | |
| Specific Gravity @25 C. | 15.5 | 1.48 | 1.66 | 1.32 | 1.32 | 1.32 | 1.44 | 1.33 | 1.24 |
| pH @25 C. | 8.5 | 8.8 | 8.0 | 8.4 | 8.7 | 8.7 | 8.1 | 11.9 | 5.9 |
| Dispersion 1% in distilled water | Colloidal | Colloidal | Colloidal | Colloidal | Colloidal | Colloidal | Coarse | Coarse | Coarse |
| VISCOSITY, SPINDLE 3, BROOKFIELD RVT: | | | | | | | | | |
| 20 rpm (cps) | 3800 | 4800 | 1800 | 3800 | 3150 | 2450 | 350 | 150 | 170 |
| 50 rpm (cps) | 1800 | 1900 | 1100 | 1860 | 1460 | 1080 | 180 | 90 | 80 |
| PARTICLE SIZE MALVERN MASTERSIZER 2000: | | | | | | | | | |
| D(50) (μm) | 0.17 | 0.17 | 0.29 | 0.37 | 0.19 | 0.20 | 6.4 | 3.5 | 4.9 |
| D(90) (μm) | 0.59 | 0.21 | 0.59 | 1.41 | 1.50 | 0.52 | 28.6 | 6.9 | 10.5 |
| TOTAL ELEMENTAL CONTENT: | | | | | | | | | |
| Nitrogen, N, % w/w | 4.5 | 17.0 | — | 5.0 | 4.9 | 4.6 | — | — | 4.5 |
| Potassium, $K_2O$, % w/w | 17.0 | — | 23.6 | — | 3.2 | 1.1 | 19.0 | 10.4 | — |
| Phosphorus, $P_2O_5$, % w/w | 19.6 | 16.1 | 23.6 | 10.6 | 10.5 | 10.8 | 15.5 | 11.6 | 16.0 |
| Zinc, Zn % w/w | 6.6 | 7.1 | 6.1 | 7.8 | 7.7 | 7.6 | 4.2 | 7.6 | 8.1 |
| Phosphite by Iodometric Titration g/L | — | — | 118 | — | — | — | — | — | — |
| Insoluble Solids Content % w/w | 28.0 | 29.0 | 28.0 | 28.0 | 28.0 | 28.0 | — | — | — | the mixture was 45° C. and the pH was 13.1. Mixing continued at 1300 rpm for 30 minutes, at which time 500 grams of monopotassium phosphate (crystalline 99% purity) was charged slowly over a period of about four minutes. The temperature of the mixture was 70° C. at the end of the monopotassium phosphate addition. Mixing continued for 1 minute at 1900 rpm and then for one additional hour at 1700 rpm. The mixture was allowed to slowly cool to 30° C. over a two hour period under agitation. At this time, 160 grams of Urea and 50 grams of prehydrated xanthan gum base was charged to the beaker and mixing continued at 1300 rpm for one hour. Water was then added to form a one liter mixture. The ingredients employed in this Example are summarized in the Table. Physical and chemical testing was performed, and the results are also provided in the Table. Specific gravity was conducted using a DMA35 Density Meter at 25° C., pH was determined at 25° C., viscosity was determined using a Brookfield RVT viscometer with a #3 spindle at 25° C., particle size was determined using a Malvern Mastersizer 2000, elemental content was determined using Inductively Coupled Plasma Optical Emission Spectrometer, and Example 2

A dispersion was prepared by using the same general procedures set forth in Example 1 except that (i) tetrapotassium pyrophosphate was employed as a dispersant in lieu of the polyacrylate, and (ii) the citric acid was excluded from the composition. The pH of the composition prior to addition of the phosphate was 13.3. The ingredients employed in this Example are summarized in the Table. Physical and chemical testing was likewise conducted and the results are set forth in the Table.

This example illustrates that other dispersants can be employed in practice of the invention and that the buffer through, for example, citric acid is not critical to the success of the invention. This example also illustrates that advantageous dispersions can be achieved without any additional agrochemicals such as urea.

Example 3

A dispersion was prepared by using the same general procedure set forth in Example 1 except that a 314 grams of the commercial product Agri-Fos 600 (Agrichem LID) was added to the dispersion in lieu of the urea and xanthan gum base. The pH of the composition prior to addition of the phosphate was 13.3. The ingredients employed in this Example are summarized in the Table. Physical and chemical testing was likewise conducted and the results are set forth in the Table.

This example illustrates that other forms of phosphorous can be included into the product after formation of the zinc phosphate dispersions. Notably, water-soluble phosphorus does not appear to react adversely with the zinc phosphate once formed. This suggests that the zinc phosphate formed by practice of this invention is stable in the presence of other water-soluble phosphorus species and is not appreciably chelated. As the skilled person appreciates, chelation of zinc is a common requirement in agricultural applications when combining zinc with phosphorus. Nonetheless, practice of this invention allows for the combination of zinc with other phosphorus compounds without chelation.

Example 4

A dispersion was prepared by using the same general procedures set forth in Example 1 except that (i) sodium hydroxide (99%) was used in lieu of potassium hydroxide, (ii) crystalline monoammonium phosphate and crystalline diammonium phosphate were employed in lieu of the monopotassium phosphate, and (iii) the citric acid was excluded from the composition. The pH of the composition prior to addition of the phosphate was 12.6. The ingredients employed in this Example are summarized in the Table. Physical and chemical testing was likewise conducted and the results are set forth in the Table.

This example illustrates how nitrogen-containing phosphate salts (in the form of ammonium) can be employed in lieu of potassium phosphate salts. This example also illustrates the use of alternative water-soluble alkali by substituting the sodium hydroxide for potassium hydroxide.

Example 5

A dispersion was prepared by using the same general procedures set forth in Example 1 except that (i) crystalline monoammonium phosphate and crystalline diammonium phosphate were employed in lieu of the monopotassium phosphate, (ii) the citric acid was excluded from the composition, and (iii) tetrapotassium pyrophosphate was used as a dispersant and added after formation of the insoluble ammonium zinc phosphate. The pH of the composition prior to addition of the phosphate was 13.2. The ingredients employed in this Example are summarized in the Table. Physical and chemical testing was likewise conducted and the results are set forth in the Table.

This Example illustrates that the type and point of addition of the dispersant can be varied. This example also reinforces the use of tetrapotassium pyrophosphate as a dispersant.

Example 6

A dispersion was prepared by using the same general procedures set forth in Example 1 except that (i) crystalline monoammonium phosphate and crystalline diammonium phosphate were employed in lieu of the monopotassium phosphate, (ii) tetrapotassium phosphate was used as a dispersant lieu of the polyacrylate stabilizer, (iii) the citric acid was excluded from the composition, and (iv) monoethanolamine was used in lieu of the potassium hydroxide. The pH of the composition prior to addition of the phosphate was 11.5. The ingredients employed in this Example are summarized in the Table. Physical and chemical testing was likewise conducted and the results are set forth in the Table.

This Example illustrates that the type of water-soluble alkali employed for pH adjustment include organic bases in lieu of inorganic bases.

Comparative Example 1

A dispersion was prepared by using the same general procedures set forth in Example 1 except that (i) zinc acetate was employed in lieu of zinc oxide, (ii) the polyacrylate dispersant was charged to the system after formation of the zinc phosphate, and (iii) the citric acid was excluded from the composition. The pH of the composition prior to addition of the phosphate was 10.6. The ingredients employed in this Example are summarized in the Table. Physical and chemical testing was likewise conducted and the results are set forth in the Table.

The particles formed in this example were coarse and not colloidal. And, the viscosity of the dispersion was an order of magnitude lower—due to lower surface area of the particles—and consequently not sufficient to keep the particles in dispersion long enough to provide it a reasonable commercial shelf life. It is believed that the disadvantages observed with this example derive from the use of a water-soluble zinc instead of zinc oxide. Notably, a water soluble alkali was used as in Example 1 and the zinc to phosphorus ratio was maintained at excess levels of phosphorus.

Comparative Example 2

A dispersion was prepared by using the same general procedures set forth in Example 1 except that (i) a very low quantity of potassium hydroxide was used (ii) a very low quantity of monopotassium phosphate was used, and (iii) the citric acid was excluded from the composition. The ingredients employed in this Example are summarized in the Table. The pH of the composition prior to addition of the phosphate was 10.4. Physical and chemical testing was likewise conducted and the results are set forth in the Table.

The particles formed in this example were coarse and not colloidal. And, the viscosity of the dispersion was an order of magnitude lower—due to lower surface area of the particles—and consequently not sufficient to keep the particles in dispersion long enough to provide it a reasonable commercial shelf life. It is believed that the disadvantages observed with this example derive from the use of insufficient amounts of phosphorus relative to zinc in the zinc oxide.

Comparative Example 3

A dispersion was prepared by using the same general procedures set forth in Example 1 except that (i) no water soluble alkali was used (ii) sodium polyacrylate was used in lieu of the polyacrylate dispersant, (iii) phosphoric acid was charged to the system after the apparent formation of the zinc phosphate, (iv) monoammonium phosphate was employed in lieu of the potassium phosphate, and (v) the citric acid was excluded from the composition. The pH of the composition prior to addition of the phosphate was 8.8. The ingredients employed in this Example are summarized in the Table. Physical and chemical testing was likewise conducted and the results are set forth in the Table.

The particles formed in this example were coarse and not colloidal. And, the viscosity of the dispersion was an order of magnitude lower—due to lower surface area of the particles—and consequently not sufficient to keep the particles in dispersion long enough to provide it a reasonable commercial shelf life. It is believed that the disadvantages observed with this example derive from insufficient modification of the pH prior to introducing the phosphate salt.

Various modifications and alterations that do not depart from the scope and spirit of this invention will become apparent to those skilled in the art. This invention is not to be duly limited to the illustrative embodiments set forth herein.

What is claimed is:

1. An aqueous dispersion comprising:
   i. water; and
   ii. zinc phosphate dispersed within the water, where said zinc phosphate is potassium zinc phosphate or ammonium zinc phosphate, where said zinc phosphate is characterized by a particle size distribution wherein at least 90% of the particles within the dispersion have a particle size of less than 1 micron, and where the dispersion has a pH of at least 6.0.

2. The aqueous dispersion of claim 1, where the zinc phosphate is potassium zinc phosphate.

3. The aqueous dispersion of claim 1, where the zinc phosphate is ammonium zinc phosphate.

4. The aqueous dispersion of claim 1, further comprising a plant nutrition compound or a plant growth regulator.

5. The aqueous dispersion of claim 1, where said dispersion is characterized by a Brookfield viscosity (Brookfield RVT, spindle #3, 25° C., 20 rpm) of from about 990 to about 5000 cps.

6. The aqueous dispersion of claim 1, where said dispersion is characterized by a pH of from about 8.0 to about 9.5.

7. The aqueous dispersion of claim 1, where said dispersion is characterized by a total solids content of from about 60% to about 70% and suspended solids content of from 19% to 20%.

8. The aqueous dispersion of claim 1, where said dispersion is characterized by a shelf life, as determined by CIPAC method: MT 46 Accelerated Storage Tests by Heating of at least 12 months.

9. The aqueous dispersion of claim 1, where said zinc phosphates are appreciably insoluble within the water.

10. The aqueous dispersion of claim 1, where said dispersion is characterized by a particle size distribution wherein at least 90% of the particles within the dispersion have a mean particle size of about 0.2 to 0.4 microns.

11. The aqueous dispersion of claim 1, where the zinc phosphate is formed by reacting zinc oxide with a phosphate salt selected from the group consisting of monopotassium phosphate, dipotassium phosphate, monoammonium phosphate, and diammonium phosphate.

12. The aqueous dispersion of claim 11, where the molar ratio of phosphorus within the phosphorus salt to zinc within the zinc oxide is greater than 1.1:1.

13. The aqueous dispersion of claim 1, where the aqueous dispersion is formed by providing an aqueous dispersion of zinc oxide with a pH of greater than 9; and reacting a phosphate salt with the zinc oxide within the aqueous dispersion of zinc oxide having a pH of greater than 9 to thereby form the flowable liquid fertilizer, where the molar ratio of moles of phosphorus within the phosphate salt to the moles of zinc within the zinc oxide is at least 1.1:1.

14. The aqueous dispersion of claim 1, where the aqueous dispersion has a pH of at least 8.7.

15. A method for preparing a flowable liquid fertilizer, the method comprising the steps of:
   i. providing an aqueous dispersion of zinc oxide with a pH of greater than 9; and
   ii. reacting a phosphate salt with the zinc oxide within the aqueous dispersion of zinc oxide having a pH of greater than 9 to thereby form the flowable liquid fertilizer, where the molar ratio of phosphorus within the phosphate salt to the moles of zinc within the zinc oxide is at least 1.1:1.

16. The method of claim 15, where said step of providing an aqueous dispersion of zinc oxide with a pH of greater than 9 includes providing an aqueous zinc oxide dispersion and then adjusting the pH of the dispersion to greater than 9.

17. The method of claim 16, where said step of adjusting the dispersion to zinc oxide to a pH of greater than 9 includes introducing a water-soluble base to the dispersion.

18. The method of claim 17, where said water-soluble base is potassium hydroxide.

19. The method of claim 18, where said step of introducing potassium hydroxide to the aqueous dispersion of zinc oxide provides a mixture wherein the molar ratio of moles of potassium within the potassium hydroxide to the moles of zinc within the zinc oxide is from about 0.8:1 to about 2.8:1.

20. The method of claim 15, further comprising the step of adding a pH buffer to the pH adjusted aqueous dispersion of zinc oxide.

21. The method of claim 15, where said aqueous dispersion of zinc oxide includes from about 11 to about 13 parts by weight zinc oxide per 100 parts by weight product.

22. The method of claim 15, where the phosphate salt is selected from the group consisting of monopotassium phosphate, dipotassium phosphate, monoammonium phosphate, and diammonium phosphate.

23. The method of claim 15, where said step of reacting includes reacting a molar ratio of phosphorus within said phosphate salt to zinc within said zinc oxide of at least 1.4:1.

24. The method of claim 15, where the aqueous dispersion of zinc oxide has a pH of greater than 9.5.

25. The method of claim 15, where the aqueous dispersion of zinc oxide has a pH of greater than 10.0.

26. The method of claim 15, where the method produces an zinc phosphate dispersed within the water, where said zinc phosphate is potassium zinc phosphate or ammonium zinc phosphate, and where said zinc phosphate is characterized by a particle size distribution wherein at least 90% of the particles within the dispersion have a particle size of less than 1 micron.

27. The method of claim 15, where said step of providing an aqueous dispersion of zinc oxide with a pH of greater than 9 includes a step of adjusting the pH of a zinc oxide dispersion by introducing a base to an aqueous mixture of zinc oxide.

28. The method of claim 27, where said base is potassium hydroxide, sodium hydroxide, aqua ammonium, monoethanolamine, diethanolamine, or triethanolamine.

29. The method of claim 15, where said step of providing an aqueous dispersion of zinc oxide with a pH of greater than 9 includes a step of preparing a zinc oxide dispersion in the presence of a base.

30. The method of claim 29, where said base is potassium hydroxide, sodium hydroxide, aqua ammonium, monoethanolamine, diethanolamine, or triethanolamine.

31. A method of applying a zinc phosphate as a fertilizer to plant, the method comprising:

i. providing an aqueous dispersion of a zinc phosphate; and
ii. applying the aqueous dispersion of a zinc phosphate to the plant,
where said zinc phosphate is potassium zinc phosphate or ammonium zinc phosphate, where said zinc phosphate is characterized by a particle size distribution wherein at least 90% of the particles within the dispersion have a particle size of less than 1 micron, and where the dispersion has a pH of at least 6.0.

* * * * *